United States Patent [19]
Gaddis et al.

[11] Patent Number: 5,905,729
[45] Date of Patent: May 18, 1999

[54] MAPPING A DATA CELL IN A COMMUNICATION SWITCH

[75] Inventors: Michael E. Gaddis, Defiance; Richard G. Bubenik, St. Louis, both of Mo.; Stephen A. Caldara, Sudbury, Mass.; Stephen A. Hauser, Burlington, Mass.; Thomas A. Manning, Northboro, Mass.

[73] Assignees: Fujitsu Network Communications, Inc., Richardson, Tex.; Fujitsu Limited, Kawasaki, Japan

[21] Appl. No.: 08/685,196

[22] Filed: Jul. 18, 1996

Related U.S. Application Data

[60] Provisional application No. 60/001,498, Jul. 19, 1995.

[51] Int. Cl.$^6$ .................................................. H04J 3/12
[52] U.S. Cl. ................................. 370/399; 370/412
[58] Field of Search ........................ 370/395, 396, 370/397, 398, 399, 412, 413, 414, 415, 416, 417, 418, 419, 392, 409, 410, 422, 426, 351, 381, 382, 383, 384; 395/427, 428, 481; 364/251

[56] References Cited

U.S. PATENT DOCUMENTS

| | | |
|---|---|---|
| 3,804,991 | 4/1974 | Hammond et al. . |
| 3,974,343 | 8/1976 | Cheney et al. . |
| 4,069,399 | 1/1978 | Barrett et al. . |
| 4,084,228 | 4/1978 | Dufond et al. . |
| 4,240,143 | 12/1980 | Bessemer et al. . |
| 4,603,382 | 7/1986 | Cole et al. ............................. 364/200 |
| 4,715,030 | 12/1987 | Koch et al. . |
| 4,727,537 | 2/1988 | Nichols . |
| 4,737,953 | 4/1988 | Koch et al. . |
| 4,748,658 | 5/1988 | Gopal et al. ............................. 379/221 |
| 4,797,881 | 1/1989 | Ben-Artzi . |
| 4,821,034 | 4/1989 | Anderson et al. .................... 340/825.8 |
| 4,837,761 | 6/1989 | Isono et al. . |
| 4,849,968 | 7/1989 | Turner . |
| 4,870,641 | 9/1989 | Pattavina . |
| 4,872,157 | 10/1989 | Hemmady et al. . |
| 4,872,159 | 10/1989 | Hemmady et al. . |

(List continued on next page.)

FOREIGN PATENT DOCUMENTS 484943  3/1992  Japan .

OTHER PUBLICATIONS

Head of Line Arbitration in ATM Switches with Input–Output Buffering and Backpressure Control. By Hosein F. Badran and H. T. Mouftah, *Globecom '91*, pp. 0347–0351.

An Ascom Timeplex White Paper, *Meeting Critical Requirements with Scalable Enterprise Networking Solutions Based on a Unified ATM Foundation*, pp. 1–12, Apr. 1994.–Apr. 1995?.

Douglas H. Hunt, *ATM Traffic Management—Another Perspective*, Business Communications Review, Jul. 1994.

Richard Bubenik et al., *Leaf Initiated Join Extensions*, Technical Committee, Signalling Subworking Group, ATM Forum/94–0325R1, Jul. 1, 1994.

Douglas H. Hunt et al., *Flow Controlled Virtual Connections Proposal for ATM Traffic Management (Revision R2)*, Traffic Management Subworking Group, ATM_Forum/94–0632R2, Aug. 1994.

(List continued on next page.)

*Primary Examiner*—Huy D. Vu
*Attorney, Agent, or Firm*—Weingarten, Schurgin, Gagnebin & Hayes LLP

[57] ABSTRACT

A system (10) is provided for mapping a data cell (32) in a communication switch. The system (10) includes a virtual translation table (40) having at least one virtual path translation table queue entry (92) and at least one virtual channel translation table queue entry (90). A to-switch port processor (12), which can access the virtual translation table (40), has at least one link (16–30) which receives the data cell (32). The to-switch port processor (12) maps the received data cell (32) to a queue descriptor using the virtual translation table (40).

30 Claims, 4 Drawing Sheets

U.S. PATENT DOCUMENTS

| | | |
|---|---|---|
| 4,872,160 | 10/1989 | Hemmady et al. . |
| 4,872,197 | 10/1989 | Pemmaraju . |
| 4,878,216 | 10/1989 | Yunoki . |
| 4,893,302 | 1/1990 | Hemmady et al. . |
| 4,893,307 | 1/1990 | McKay et al. . |
| 4,894,824 | 1/1990 | Hemmady et al. . |
| 4,897,833 | 1/1990 | Kent et al. . |
| 4,897,841 | 1/1990 | Gang, Jr. . |
| 4,899,333 | 2/1990 | Roediger . |
| 4,920,531 | 4/1990 | Isono et al. . |
| 4,922,503 | 5/1990 | Leone . |
| 4,933,938 | 6/1990 | Sheehy . |
| 4,942,574 | 7/1990 | Zelle . |
| 4,947,390 | 8/1990 | Sheehy . |
| 4,953,157 | 8/1990 | Franklin et al. . |
| 4,956,839 | 9/1990 | Torii et al. . |
| 4,958,341 | 9/1990 | Hemmady et al. . |
| 4,979,100 | 12/1990 | Makris et al. . |
| 4,993,018 | 2/1991 | Hajikano et al. . |
| 5,014,192 | 5/1991 | Mansfield et al. . |
| 5,021,949 | 6/1991 | Morten et al. . |
| 5,029,164 | 7/1991 | Goldstein et al. . |
| 5,060,228 | 10/1991 | Tsutsui et al. . |
| 5,067,123 | 11/1991 | Hyodo et al. . |
| 5,070,498 | 12/1991 | Kakuma et al. . |
| 5,083,269 | 1/1992 | Syobatake et al. ............... 395/425 |
| 5,084,867 | 1/1992 | Tachibana et al. . |
| 5,084,871 | 1/1992 | Carn et al. . |
| 5,090,011 | 2/1992 | Fukuta et al. . |
| 5,090,024 | 2/1992 | Vander Mey et al. . |
| 5,093,827 | 3/1992 | Franklin et al. . |
| 5,093,912 | 3/1992 | Dong et al. ..................... 395/650 |
| 5,115,429 | 5/1992 | Hluchyj et al. . |
| 5,119,369 | 6/1992 | Tanabe et al. . |
| 5,119,372 | 6/1992 | Verbeek . |
| 5,128,932 | 7/1992 | Li . |
| 5,130,975 | 7/1992 | Akata . |
| 5,130,982 | 7/1992 | Ash et al. . |
| 5,132,966 | 7/1992 | Hayano et al. . |
| 5,146,474 | 9/1992 | Nagler et al. . |
| 5,146,560 | 9/1992 | Goldberg et al. . |
| 5,150,358 | 9/1992 | Punj et al. . |
| 5,151,897 | 9/1992 | Suzuki . |
| 5,157,657 | 10/1992 | Potter et al. . |
| 5,163,045 | 11/1992 | Caram et al. . |
| 5,163,046 | 11/1992 | Hahne et al. . |
| 5,179,556 | 1/1993 | Turner . |
| 5,179,558 | 1/1993 | Thacker et al. . |
| 5,185,743 | 2/1993 | Murayama et al. . |
| 5,191,582 | 3/1993 | Upp . |
| 5,191,652 | 3/1993 | Dias et al. ..................... 395/200 |
| 5,193,151 | 3/1993 | Jain . |
| 5,197,067 | 3/1993 | Fujimoto et al. . |
| 5,198,808 | 3/1993 | Kudo . |
| 5,199,027 | 3/1993 | Barri . |
| 5,239,539 | 8/1993 | Uchida et al. . |
| 5,253,247 | 10/1993 | Hirose et al. . |
| 5,253,248 | 10/1993 | Dravida et al. . |
| 5,255,264 | 10/1993 | Cotton et al. . |
| 5,255,266 | 10/1993 | Watanabe et al. . |
| 5,257,311 | 10/1993 | Naito et al. ..................... 380/48 |
| 5,258,979 | 11/1993 | Oomura et al. . |
| 5,265,088 | 11/1993 | Takigawa et al. . |
| 5,267,232 | 11/1993 | Katsube et al. . |
| 5,268,897 | 12/1993 | Komine et al. . |
| 5,271,010 | 12/1993 | Miyake et al. . |
| 5,272,697 | 12/1993 | Fraser et al. . |
| 5,274,641 | 12/1993 | Shobatake et al. . |
| 5,274,768 | 12/1993 | Traw et al. . |
| 5,280,469 | 1/1994 | Taniguchi et al. . |
| 5,280,470 | 1/1994 | Buhrke et al. . |
| 5,282,201 | 1/1994 | Frank et al. . |
| 5,283,788 | 2/1994 | Morita et al. . |
| 5,285,446 | 2/1994 | Yonehara . |
| 5,287,349 | 2/1994 | Hyodo et al. . |
| 5,287,535 | 2/1994 | Sakagawa et al. . |
| 5,289,462 | 2/1994 | Ahmadi et al. . |
| 5,289,463 | 2/1994 | Mobasser . |
| 5,289,470 | 2/1994 | Chang et al. . |
| 5,291,481 | 3/1994 | Doshi et al. . |
| 5,291,482 | 3/1994 | McHarg et al. . |
| 5,295,134 | 3/1994 | Yoshimura et al. . |
| 5,301,055 | 4/1994 | Bagchi et al. . |
| 5,301,184 | 4/1994 | Uriu et al. . |
| 5,301,190 | 4/1994 | Tsukuda et al. . |
| 5,301,193 | 4/1994 | Toyofuku et al. . |
| 5,303,232 | 4/1994 | Faulk, Jr. . |
| 5,305,311 | 4/1994 | Lyles . |
| 5,309,431 | 5/1994 | Tominaga et al. . |
| 5,309,438 | 5/1994 | Nakajima . |
| 5,311,586 | 5/1994 | Bogart et al. .................... 379/221 |
| 5,313,454 | 5/1994 | Bustini et al. . |
| 5,313,458 | 5/1994 | Suzuki . |
| 5,315,586 | 5/1994 | Charvillat . |
| 5,319,638 | 6/1994 | Lin . |
| 5,321,695 | 6/1994 | Proctor et al. . |
| 5,323,389 | 6/1994 | Bitz et al. . |
| 5,333,131 | 7/1994 | Tanabe et al. . |
| 5,333,134 | 7/1994 | Ishibashi et al. . |
| 5,335,222 | 8/1994 | Kamoi et al. . |
| 5,335,325 | 8/1994 | Frank et al. . |
| 5,339,310 | 8/1994 | Taniguchi . |
| 5,339,317 | 8/1994 | Tanaka et al. . |
| 5,339,318 | 8/1994 | Tanaka et al. . |
| 5,341,366 | 8/1994 | Soumiya et al. . |
| 5,341,373 | 8/1994 | Ishibashi et al. . |
| 5,341,376 | 8/1994 | Yamashita . |
| 5,341,483 | 8/1994 | Frank et al. ..................... 395/400 |
| 5,345,229 | 9/1994 | Olnowich et al. ............... 340/825.8 |
| 5,350,906 | 9/1994 | Brody et al. . |
| 5,355,372 | 10/1994 | Sengupta et al. . |
| 5,357,506 | 10/1994 | Sugawara . |
| 5,357,507 | 10/1994 | Hughes et al. . |
| 5,357,508 | 10/1994 | Le Boudec et al. . |
| 5,357,510 | 10/1994 | Norizuki et al. . |
| 5,359,600 | 10/1994 | Ueda et al. . |
| 5,361,251 | 11/1994 | Aihara et al. . |
| 5,361,372 | 11/1994 | Rege et al. . |
| 5,363,433 | 11/1994 | Isono . |
| 5,363,497 | 11/1994 | Baker et al. ..................... 395/425 |
| 5,365,514 | 11/1994 | Hershey et al. . |
| 5,369,570 | 11/1994 | Parad . |
| 5,371,893 | 12/1994 | Price et al. ..................... 395/725 |
| 5,373,504 | 12/1994 | Tanaka et al. . |
| 5,375,117 | 12/1994 | Morita et al. . |
| 5,377,262 | 12/1994 | Bales et al. ..................... 379/220 |
| 5,377,327 | 12/1994 | Jain et al. . |
| 5,379,297 | 1/1995 | Glover et al. . |
| 5,379,418 | 1/1995 | Shimazaki et al. . |
| 5,390,170 | 2/1995 | Sawant et al. . |
| 5,390,174 | 2/1995 | Jugel . |
| 5,390,175 | 2/1995 | Hiller et al. . |
| 5,392,280 | 2/1995 | Zheng . |
| 5,392,402 | 2/1995 | Robrock, II . |
| 5,394,396 | 2/1995 | Yoshimura et al. . |
| 5,394,397 | 2/1995 | Yanagi et al. . |
| 5,398,235 | 3/1995 | Tsuzuki et al. . |
| 5,400,337 | 3/1995 | Munter . |
| 5,402,415 | 3/1995 | Turner . |
| 5,412,648 | 5/1995 | Fan . |
| 5,414,703 | 5/1995 | Sakaue et al. . |
| 5,418,942 | 5/1995 | Krawchuk et al. ............... 395/600 |

| | | |
|---|---|---|
| 5,420,858 | 5/1995 | Marshall et al. . |
| 5,420,988 | 5/1995 | Elliott ................................... 395/275 |
| 5,422,879 | 6/1995 | Parsons et al. . |
| 5,425,021 | 6/1995 | Derby et al. . |
| 5,425,026 | 6/1995 | Mori . |
| 5,426,635 | 6/1995 | Mitra et al. . |
| 5,432,713 | 7/1995 | Takeo et al. ........................... 364/514 |
| 5,432,784 | 7/1995 | Ozveren . |
| 5,432,785 | 7/1995 | Ahmed et al. . |
| 5,432,908 | 7/1995 | Heddes et al. ......................... 395/250 |
| 5,436,886 | 7/1995 | McGill . |
| 5,436,893 | 7/1995 | Barnett . |
| 5,440,547 | 8/1995 | Easki et al. . |
| 5,444,702 | 8/1995 | Burnett et al. . |
| 5,446,733 | 8/1995 | Tsuruoka . |
| 5,446,737 | 8/1995 | Cidon et al. . |
| 5,446,738 | 8/1995 | Kim et al. . |
| 5,448,559 | 9/1995 | Hayter et al. . |
| 5,448,621 | 9/1995 | Knudsen . |
| 5,450,406 | 9/1995 | Esaki et al. . |
| 5,452,296 | 9/1995 | Shimizu . |
| 5,454,299 | 10/1995 | Thessin et al. . |
| 5,455,820 | 10/1995 | Yamada . |
| 5,455,825 | 10/1995 | Lauer et al. . |
| 5,457,687 | 10/1995 | Newman . |
| 5,459,743 | 10/1995 | Fukuda et al. . |
| 5,461,611 | 10/1995 | Drake, Jr. et al. . |
| 5,463,620 | 10/1995 | Sriram . |
| 5,463,629 | 10/1995 | Ko . |
| 5,463,775 | 10/1995 | DeWitt et al. . |
| 5,465,331 | 11/1995 | Yang et al. . |
| 5,465,365 | 11/1995 | Winterbottom . |
| 5,469,003 | 11/1995 | Kean . |
| 5,473,608 | 12/1995 | Gagne et al. . |
| 5,475,679 | 12/1995 | Munter . |
| 5,479,401 | 12/1995 | Bitz et al. . |
| 5,479,402 | 12/1995 | Hata et al. . |
| 5,483,526 | 1/1996 | Ben-Nun et al. . |
| 5,485,453 | 1/1996 | Wahlman et al. . |
| 5,485,455 | 1/1996 | Dobbins et al. . |
| 5,487,063 | 1/1996 | Kakuma et al. . |
| 5,488,606 | 1/1996 | Kakuma et al. . |
| 5,491,691 | 2/1996 | Shtayer et al. . |
| 5,491,694 | 2/1996 | Oliver et al. . |
| 5,493,566 | 2/1996 | Ljungberg et al. . |
| 5,497,369 | 3/1996 | Wainwright . |
| 5,499,238 | 3/1996 | Shon . |
| 5,504,741 | 4/1996 | Yamanaka et al. . |
| 5,504,742 | 4/1996 | Kakuma et al. . |
| 5,506,834 | 4/1996 | Sekihata et al. . |
| 5,506,839 | 4/1996 | Hatta . |
| 5,506,956 | 4/1996 | Cohen . |
| 5,509,001 | 4/1996 | Tachibana et al. . |
| 5,509,007 | 4/1996 | Takashima et al. . |
| 5,513,134 | 4/1996 | Cooperman et al. . |
| 5,513,178 | 4/1996 | Tanaka . |
| 5,513,180 | 4/1996 | Miyake et al. . |
| 5,515,359 | 5/1996 | Zheng . |
| 5,517,495 | 5/1996 | Lund et al. . |
| 5,519,690 | 5/1996 | Suzuka et al. . |
| 5,521,905 | 5/1996 | Oda et al. . |
| 5,521,915 | 5/1996 | Dieudonne et al. . |
| 5,521,916 | 5/1996 | Choudhury et al. . |
| 5,521,917 | 5/1996 | Watanabe et al. . |
| 5,521,923 | 5/1996 | Willmann et al. . |
| 5,523,999 | 6/1996 | Takano et al. . |
| 5,524,113 | 6/1996 | Gaddis . |
| 5,526,344 | 6/1996 | Diaz et al. . |
| 5,528,588 | 6/1996 | Bennett et al. . |
| 5,528,590 | 6/1996 | Iidaka et al. . |
| 5,528,591 | 6/1996 | Lauer . |
| 5,530,695 | 6/1996 | Digne et al. . |
| 5,533,009 | 7/1996 | Chen . |
| 5,533,020 | 7/1996 | Byrn et al. . |
| 5,535,196 | 7/1996 | Aihara et al. . |
| 5,535,197 | 7/1996 | Cotton . |
| 5,537,394 | 7/1996 | Abe et al. . |
| 5,541,912 | 7/1996 | Choudhury et al. . |
| 5,544,168 | 8/1996 | Jeffrey et al. . |
| 5,544,169 | 8/1996 | Norizuki et al. . |
| 5,544,170 | 8/1996 | Kasahara . |
| 5,546,389 | 8/1996 | Wippenbeck et al. . |
| 5,546,391 | 8/1996 | Hochschild et al. . |
| 5,546,392 | 8/1996 | Boal et al. . |
| 5,550,821 | 8/1996 | Akiyoshi . |
| 5,550,823 | 8/1996 | Irie et al. . |
| 5,553,057 | 9/1996 | Nakayama . |
| 5,553,068 | 9/1996 | Aso et al. . |
| 5,555,243 | 9/1996 | Kakuma et al. . |
| 5,555,265 | 9/1996 | Kakuma et al. . |
| 5,557,607 | 9/1996 | Holden . |
| 5,568,479 | 10/1996 | Watanabe et al. . |
| 5,570,361 | 10/1996 | Norizuki et al. . |
| 5,570,362 | 10/1996 | Nishimura . |
| 5,572,522 | 11/1996 | Calamvokis et al. . |
| 5,577,032 | 11/1996 | Sone et al. . |
| 5,577,035 | 11/1996 | Hayter et al. . |
| 5,583,857 | 12/1996 | Soumiya et al. ........................ 370/233 |
| 5,583,858 | 12/1996 | Hanaoka ................................ 370/392 |
| 5,583,861 | 12/1996 | Holden ................................... 370/395 |
| 5,590,132 | 12/1996 | Ishibashi et al. ........................ 370/236 |
| 5,602,829 | 2/1997 | Nie et al. ................................. 370/235 |
| 5,610,913 | 3/1997 | Tomonaga et al. ..................... 370/219 |
| 5,623,405 | 4/1997 | Isono ....................................... 395/230 |
| 5,625,846 | 4/1997 | Kobayakawa et al. ................ 395/872 |
| 5,633,861 | 5/1997 | Hanson et al. . |

OTHER PUBLICATIONS

Flavio Bonomi et al., The Rate–Based Flow Control Framework for the Available Bit Rate ATM Service, *IEEE Network*, Mar./Apr. 1995, pp. 25–39.

R. Jain, Myths About Congestion Management in High Speed Networks, *Internetworking Research and Experience*, vol. 3, 101–113 (1992).

Douglas H. Hunt et al., *Credit–Based FCVC Proposal for ATM Traffic Management (Revision R1)*, ATM Forum Technical Committee Traffic Management Subworking Group, ATM_Forum/94–0168R1, Apr. 28, 1994.

Douglas H. Hunt et al., *Action Item Status for Credit–Based FCVC Proposal*, ATM Forum Technical Committee Traffic Management Subworking Group, ATM_Forum/94–0439, Apr. 28, 1994.

Timothy P. Donahue et al., *Arguments in Favor of Continuing Phase 1 as the Initial ATM Forum P–NNI Routing Protocol Implementation*, ATM Forum Technical Committee, ATM Forum/94–0460, Apr. 28, 1994.

Richard Bubenick et al., *Leaf Initiated Join Extensions*, Technical Committee, Signalling Subworking Group, ATM Forum/94–0325, Apr. 28, 1994.

Rob Coltun et al., *PRP: A P–NNI Routing Protocol Proposal*, ATM Forum Technical Committee, ATM Forum/94–0492, Apr. 28, 1994.

Richard Bubenik et al., *Leaf Initiated Join Extensions*, ATM Forum Technical Committee, Signalling Subworking Group, ATM Forum 94–0325, Apr. 28, 1994.

Richard Bubenik et al., *Requirements for Phase 2 Signaling Protocol*, ATM Forum Technical Committee, Signalling Subworking Group, ATM Forum 94–1078, Jan. 1, 1994.

H.T. Kung and K. Chang, *Receiver–Oriented Adaptive Buffer Allocation in Credit–Based Flow Control for ATM Networks*, Proceedings of INFOCOM '95, Apr. 2–6, 1995, pp. 1–14.

H.T. Kung et al., *Credit–Based Flow Control for ATM Networks: Credit Update Protocol, Adaptive Credit Allocation, and Statistical Multiplexing*, Proceedings of ACM SIGCOMM '94 Symposium on Communications Architectures, Protocols and Applications, Aug. 31–Sep. 2, 1994, pp. 1–14.

SITA, ATM RFP: *C–Overall Technical Requirements*, Sep. 1994.

Hosein F. Badran et al., Head of Line Arbitration in ATM Switches with Input–Output Buffering and Backpressure Control, *Globecom*, pp. 347–351, 1991.

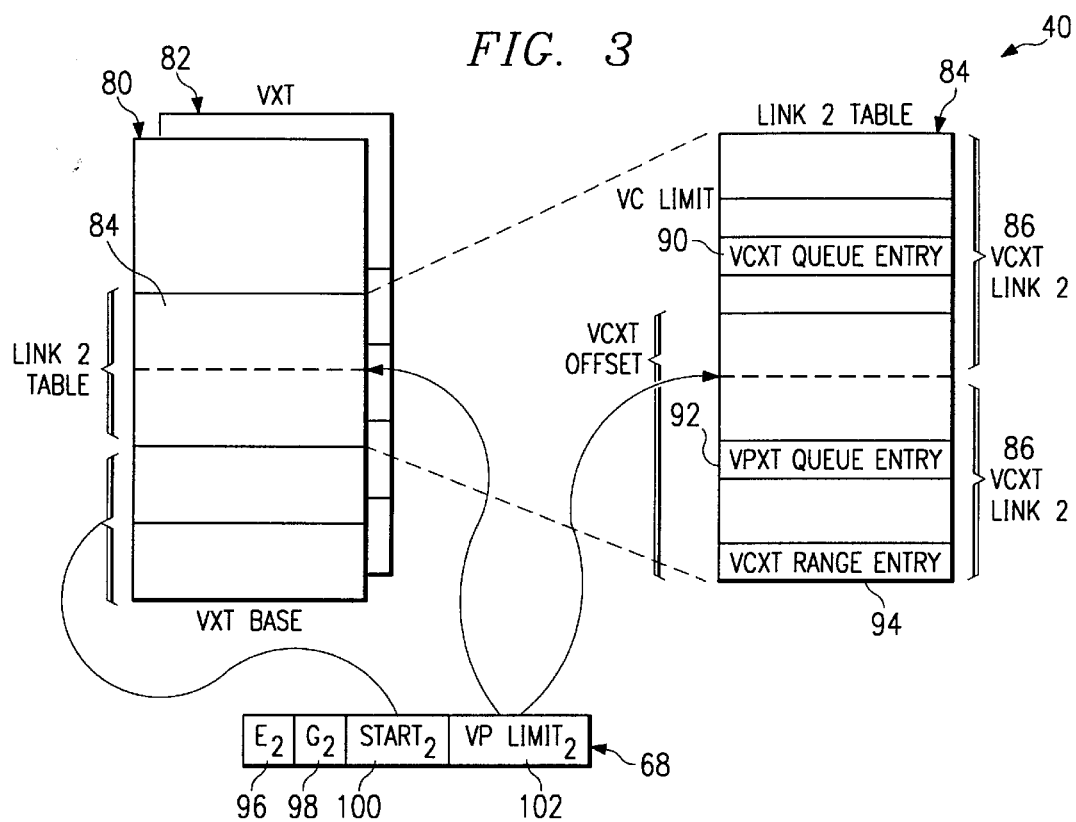

MAPPING A DATA CELL IN A COMMUNICATION SWITCH

RELATED PATENT APPLICATION

This application is related to U.S. Provisional Patent Application Ser. No. 60/001,498, filed Jul. 19, 1995.

TECHNICAL FIELD OF THE INVENTION

This invention relates generally to the field of communication systems, and more particularly to mapping a data cell in a communication switch.

BACKGROUND OF THE INVENTION

A communication system includes a collection of components that communicate, manipulate, and process information in a variety of ways. This system may support different access technologies, such as frame relay, circuit services, and new and evolving connection-based or connectionless services, that communicate information, such as data, voice, and video. Switches in the communication systems employ hardware and software to route information generated by access technologies to an intended destination.

In such communication switches, a to-switch port processor may receive various data cells over multiple connections or links. Each data cell may have a header which contains multiple bits of information used in processing the data cell. In particular, the header may comprise a 12-bit virtual path identification (VPI) field and a 16-bit virtual channel identification (VCI) field. Together, the VPI field and VCI field form a 28-bit identifier for the data cell. The 28 bits of information yield $2^{28}=268,435,456$ combinations for the identifier. Typically, a data cell is processed according to a queue descriptor associated with its VPI/VCI identifier. It is extremely expensive, however, to map all of the combinations for the VPI/VCI identifier in a look-up table which includes a separate queue descriptor for each combination.

SUMMARY OF THE INVENTION

In accordance with the present invention, the disadvantages and problems associated with mapping a data cell in a communication switch have been substantially reduced or eliminated.

In accordance with one embodiment of the present invention, a system is provided for mapping a data cell in a communication switch. The system includes a virtual translation table having at least one virtual path translation table queue entry and at least one virtual channel translation table queue entry. A to-switch port processor, which can access the virtual translation table, has at least one link which receives a data cell. The to-switch port processor maps the received data cell to a queue number using the virtual translation table. Queue number is used to identify an associated queue descriptor to access state information used to manage the connection.

In accordance with another embodiment of the present invention, a method is provided for mapping multiple data cells to a single queue descriptor in a communication switch. The method includes receiving a first and a second data cell. Each of the first and second data cells has an associated identifier. The identifier of the first data cell is different from the identifier of the second data cell. A virtual translation table comprising a plurality of queue entries is referenced. Each queue entry specifies the same queue descriptor. The first and second data cells are mapped to the queue descriptor using different queue entries from the virtual translation table.

An important technical advantage of the present invention includes providing a virtual translation table for mapping data cells. The virtual translation table includes a plurality of data entries, which are referenced according to ranges of VCI fields and VPI fields. Each data entry in the virtual translation table specifies a queue number. Multiple data entries may specify the same queue number. Each queue number can be used to reference a specific queue descriptor which dictates how a data cell should be processed. Because multiple VPI/VCI identifiers can be mapped to the same queue descriptor via the virtual translation table, a separate queue descriptor is not required for each combination of the VPI/VCI identifier. Thus, the amount of memory required to support data cells in a communication switch is substantially minimized or reduced. Other important technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description taken in conjunction with the accompanying drawings, in which:

FIG. 3 illustrates details for the virtual translation table shown in FIG. 1 and an exemplary link boundary entry shown in FIG. 2;

FIG. 4 illustrates exemplary formats of various data entries shown in FIG. 3.

DETAILED DESCRIPTION OF THE INVENTION

The preferred embodiment of the present invention and its advantages are best understood by referring to FIGS. 1–5 of the drawings, like numerals being used for like and corresponding parts of the various drawings.

Figure 1:
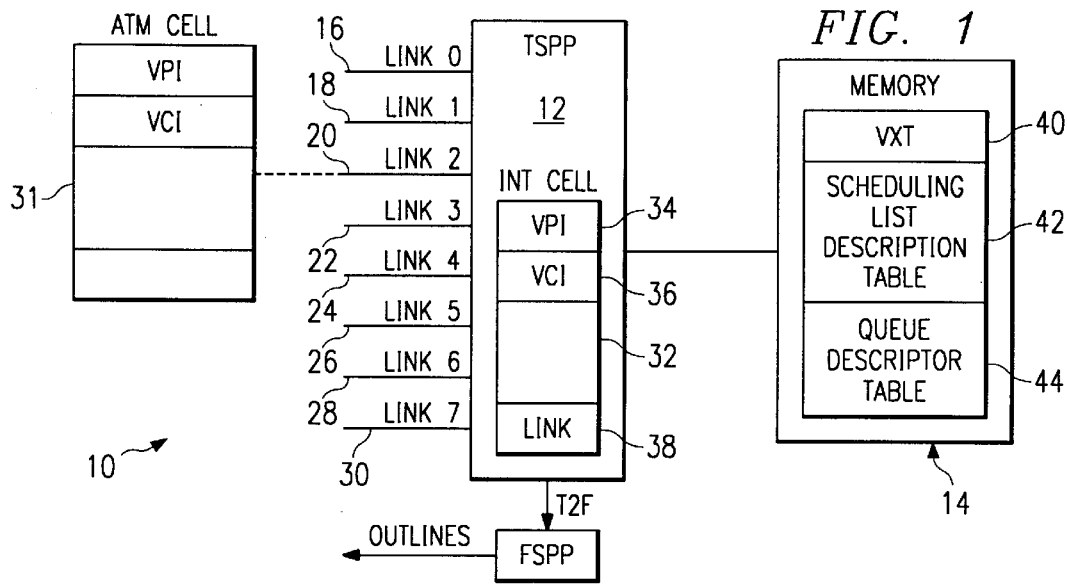
FIG. 1 illustrates a system for mapping a data cell in a communication switch.

FIG. 1 illustrates a system 10 for mapping data cells in a communication switch, such as an asynchronous transfer mode (ATM) switch. System 10 includes a to-switch port processor (TSPP) and a memory 14.

TSPP 12 may be implemented as an application-specific integrated circuit (ASIC). TSPP 12 includes a plurality of links 16–30 (labeled as LINK0-LINK7 in FIG. 1). Although TSPP 12 generally supports eight such links, it must be understood that in other embodiments, TSPP 12 may include either more or less links. Links 16–30 may support asynchronous transfer mode (ATM) cell relay (OC-12, OC-3c, 155 Mbps UTP), frame relay (T1, E1, T3, E3, V.35), circuit emulation (Ti, E1, T3, E3), internetworking using Ethernet, Fast Ethernet, Internet Protocol (IP), or IP over ATM, or any other communications protocol or access technology. Each link 16–30 can receive various data cells, such as an incoming ATM cell 31. TSPP 12 converts the incoming ATM cell 31 into an internal cell 32 for transfer within system 10. Internal cell 32 constitutes a "packet" of information which may include a virtual path identification (VPI) field 34 and a virtual channel identification (VCI) field 36 that is taken from incoming ATM cell 31. TSPP 12 inserts a link field 38 into internal cell 32 that identifies the link that the incoming ATM cell arrived on. VPI field 34 and VCI field 36 may be part of a header for internal cells 32. TSPP 12 includes a plurality of data structures which can be used in processing internal cells 32. These data structures are illustrated and described below in more detail with reference to FIG. 2.

Memory 14 may be coupled to TSPP 12. Memory 14 can be implemented in memory internal or external to TSPP 12. In one embodiment, memory 14 may be implemented in an external random access memory (RAM). Memory 14 includes a plurality of data tables including virtual translation table (VXT) 40 and a queue descriptor table 44. VXT 40 is illustrated and described below in more detail with reference to FIG. 3. Queue descriptor table 44 comprises a plurality of queue descriptors which can be used to direct the operation of queues for processing of data cells. Each individual queue can be set to process either data cells or special cells. The same queue descriptor can be used to process cells having different VPI/VCI identifiers. The information in VXT 40 and queue descriptor table 44 may be configured or initialized by software.

Figure 2:
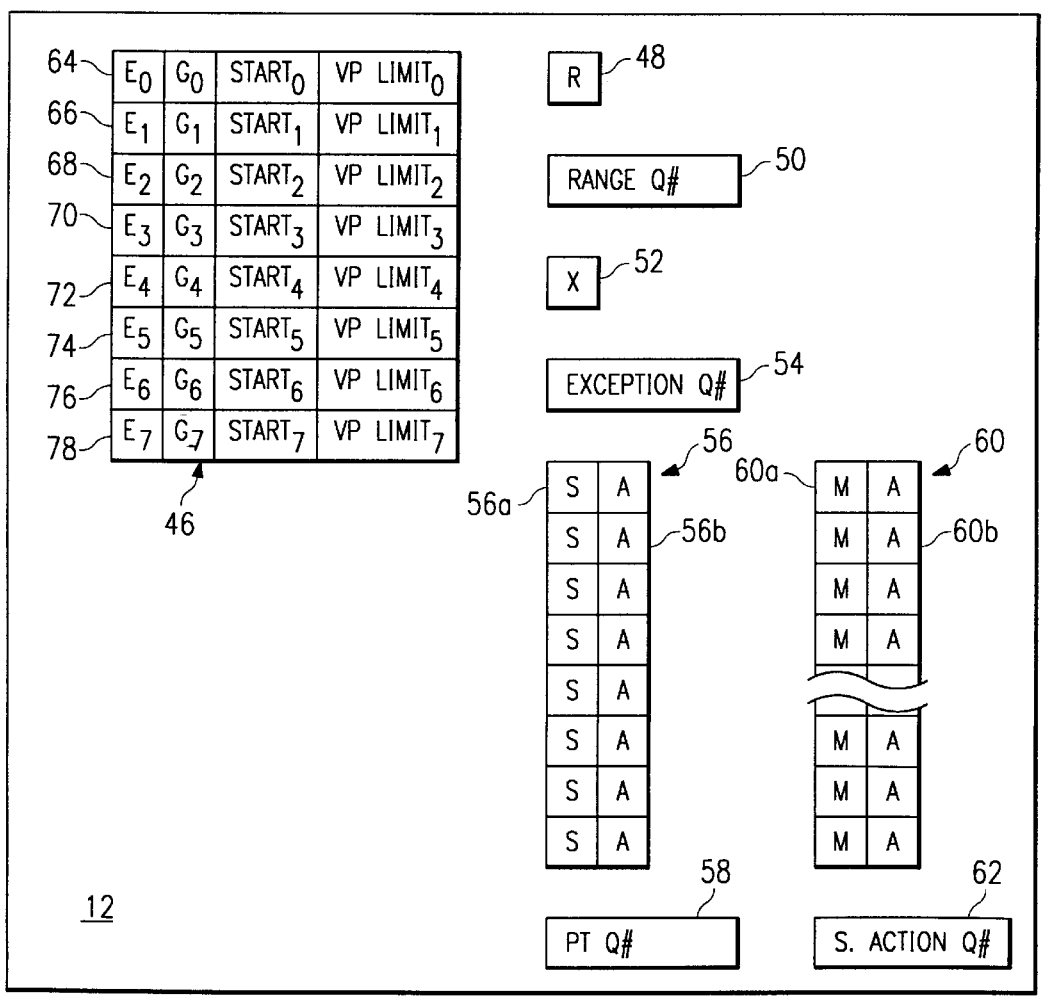
FIG. 2 illustrates a number of data structures contained within the to-switch port processor shown in FIG. 1.

FIG. 2 illustrates various data structures that may be contained within TSPP 12 shown in FIG. 1. These data structures include a link boundary look-up table 46, a range (R) bit 48, a range queue number 50, an exception (X) bit 52, an exception queue number 54, a Payload Type (PT) action table 56 having an S bit 56a and an A bit 56b, a PT queue number 58, a special action table 60 having an M bit 60a and an A bit 60b, and a special action queue number 62. These data structures can be implemented as registers and may be configured or initialized by software.

Link boundary look-up table 46 comprises a number of link boundary entries 64–78, which correspond to links 16–30, respectively, of TSPP 12. Each link boundary entry 64–78 can be used to associate a data cell received at the corresponding link 16–30 with a related data entry in VXT 40, as described below in more detail.

Range bit 48 is used to determine whether a data cell should be discarded if the VPI field of the cell is not within an appropriate range. Range queue number 50 comprises a queue number that is used for further processing of a data cell with an out of range VPI whenever range bit 48 is set to "1." Range queue number 50 is associated with a queue descriptor that will redirect internal cell 32 for special processing. Exception bit 52 is used to determine whether a data cell should be discarded because it is an exception. Exception queue number 54 comprises a queue number which may be used when exception bit 52 is set to "1." Like range queue number 50, exception queue number 54 also references a queue descriptor that will redirect the cell for special processing.

PT action table 56 comprises a number of entries which can be used to direct the processing of a data cell under certain conditions, as described below. The entries in PT action table 52 are indexed by the PT field in the cell header. In one embodiment, PT action table 52 comprises eight entries, each entry corresponding to the eight possible payload types in an incoming ATM cell 31. PT queue number 58 specifies a PT queue number which can be used to reference a queue descriptor contained in queue descriptor table 44. Special action table 60 also includes a number of entries which can be used to direct the processing of a data cell under certain conditions. The entries in special action table 60 are indexed by the VCI field 36 of internal cell 32. In one embodiment, special action table 60 comprises thirty-two entries, each entry corresponding to a particular special action in the communication switch. Special action queue number 62 identifies a special action queue number which can be used to reference a queue descriptor in queue descriptor table 44.

FIG. 3 illustrates details for VXT 40 shown FIG. 1 and exemplary link boundary entry 68 shown in FIG. 2. In particular, FIG. 3 illustrates how link boundary entry 68 can be used to reference a particular data entry within VXT 40.

VXT 40 comprises a connection VXT 80 and a flow control VXT 82, which are stored in memory 14 at an offset defined by the same address. Connection VXT 80 is used to map the header of internal cell 32 to a specific queue number which can then be used to reference a queue descriptor in queue descriptor table 44. Flow control VXT 82 is referenced when a cell received at TSPP 12 is a credit update cell. In particular, flow control VXT 82 is used to map the credit VPI/VCI contained in the payload of a credit update cell to a from-switch port processor (FSPP) queue number associated with a particular FSPP 13. For any specific VXT 40, connection VXT 80 and flow control VXT 82 are identically structured. In the remainder of this description, the term "VXT 40" generally applies to both connection VXT 80 and flow control VXT 82. VXT 40 may include a plurality of data entries (described below) used in mapping a data cell to a descriptor. The number of data entries may be equal to the number of queues supported for a particular port processor configuration. VXT 40 can be divided into a number of link tables, each corresponding to a link 16–30 of TSPP 12. For example, link "2" table 84 corresponds to link 20 (labeled as "LINK2") of TSPP 12. It should be understood that in an embodiment in which multiple TSPPs 12 are present, a separate link table is maintained for each link of each TSPP 12.

Exemplary link "2" table 84 in VXT 40 comprises a virtual channel translation table (VCXT) section 86 and a virtual path translation table (VPXT) section 88. VCXT section 86 may include one or more VCXT queue entries, such as exemplary VCXT queue entry 90. VPXT section 88 may include one or more VPXT queue entries, such as exemplary VPXT queue entry 92, and one or more VCXT range entries, such as exemplary VCXT range entry 94. Generally, the VCXT queue entries and VPXT queue entries comprise queue numbers for referencing queue descriptors contained in queue descriptor table 44 of memory 14 shown in FIG. 1. VCXT range entries define a particular range within VCXT section 86 within which the VCI in a particular internal cell 32 should fall. Exemplary VCXT queue entry 90, VPXT queue entry 92, and VCXT range entry 94 are illustrated and described below in more detail with reference to FIG. 4.

The various link tables, such as link "2" table 84, in VXT 40 can be referenced and defined by the link boundary entries 64–78 in link boundary look-up table 46 of TSPP 12 shown in FIG. 2. Link boundary entry 68 is shown for purposes of illustration. Link boundary entry 68 comprises an enable (E) bit 80, a GFC (G) bit 82, a start 84, and a VP limit 86. Enable bit 80 is used to selectively enable or disable processing for the link corresponding to the link boundary entry. When enable bit 80 is set to "0," all data cells entering TSPP 14 from that link are discarded. GFC bit 82 dictates whether the GFC field of the incoming ATM cell 31 should be set to "0000." Start 84 and VP limit 86 define physical boundaries in VXT 40. Generally, a "start" specifies an offset from the base of VXT 40 to the link table for the link corresponding to the link boundary entry. For example, start 84 specifies the offset for link "2" table 84. VPI limit 86 specifies the boundary which separates VCXT section 86 from VPXT section 88 in link table 84.

FIG. 4 illustrates details for exemplary data entries 90–94 shown in FIG. 3. VCXT range entry 94 comprises a VCXT offset 104, a virtual channel (VC) limit 106, a terminated virtual path (T) bit 108, and a valid (V) bit 110. VCXT offset 104 and VC limit 106 define a VCI range within VCXT section 86. In particular, VCXT offset 104 defines an offset from the base of link table 84 to the beginning of the VCI range. VC limit 86 defines the end of the VCI range. Terminated virtual path bit 108 can be used to distinguish between the various data entries in VPXT section 88. If terminated virtual path bit 108 is set to "0," the entry will be a VCXT range entry. If the terminated virtual path bit 108 is set to "1," then the entry is a VPXT queue entry. Valid bit 110 is used to specify whether VCXT range entry 94 is valid or not. If valid bit 110 is set to "1," then the VCXT range entry is valid. Otherwise, if valid bit 110 is set to "0," VCXT range entry 94 is invalid.

VPXT queue entry 92 comprises a TSPP virtual path selection (VPS) queue number 112, a special action (S) bit 114, an RCC bypass (RB) bit 116, an FSPP flow control queue number 118, a terminated virtual path (T) bit 120, and a valid (V) bit 122. TSPP VPS queue number 112 can be used to reference a queue descriptor for the virtual path (VP) connection of a data cell, such queue descriptor being contained in queue descriptor table 44. Different VPXT queue entries may contain the same TSPP VPS queue number, thereby referencing the same queue descriptor. Special action bit 114 can be used to specify whether special processing, as defined by special action table 60 in TSPP 12, should be performed on a data cell. If special action bit 114 is set to "1," special processing should be performed. RCC bypass bit 116 can be used to specify whether the decoding of QFC protocol message cells on the VP connection should be bypassed. If RCC bypass bit 116 is set to "1," normal decoding of cell headers is used to determine if the data cell is a QFC protocol message cell. If the data cell received at TSPP 12 is a credit update cell, then FSPP flow control queue number 118 is transmitted along with credit information to an appropriate FSPP over a suitable interface, such as a T2F interface. Like terminated virtual path bit 108 in VCXT range entry 94, terminated virtual path bit 120 is used to distinguish between a VCXT range entry and a VPXT queue entry. If terminated virtual path bit 120 is set to "1," then the entry is a VPXT queue entry. Valid bit 122 can be used to specify whether VPXT queue entry 92 is valid or invalid.

VCXT queue entry 90 comprises a TSPP virtual channel service (VCS) queue number 124, a special action (S) bit 126, an operation and maintenance (OAM)/(M) bit 128, an FSPP flow control queue number 130, a terminated virtual path (T) bit 132, and a valid (V) bit 134. TSPP VCS queue number 124 can be used to reference a particular queue descriptor contained in queue descriptor table 44 of memory 14. Different VCXT queue entries may contain the same TSPP VCS queue number, thereby referencing the same queue descriptor. Special action bit 126 can be used to specify whether special processing, as defined by special action table 60 in TSPP 12, should be performed. OAM bit 128 can be used to specify whether cells should be specially processed for OAM cell insertion. If OAM bit 128 is set to "1," then OAM cell processing should be performed. If the received data cell is a credit update cell, then FSPP flow control queue number 130 is sent to an appropriate FSPP along with credit information. Terminated virtual path bit 132 does not serve any function in VCXT queue entry 90 because this bit is used to distinguish between VCXT range entries and VPXT queue entries. Valid bit 134 can be used to specify whether VCXT queue entry 90 is valid.

Generally, in operation, a data cell, such as incoming ATM cell 31, is received at one of links 16–30 of TSPP 12.

TSPP 12 maps the cell to an appropriate queue descriptor using VXT 40 in memory 14 and the data structures 46–62 contained on TSPP 12. The queue descriptor can be used to direct processing of the cell. A more detailed description of the operation of system 10 is provided with reference to FIGS. 5A and B.

Figure 5A:
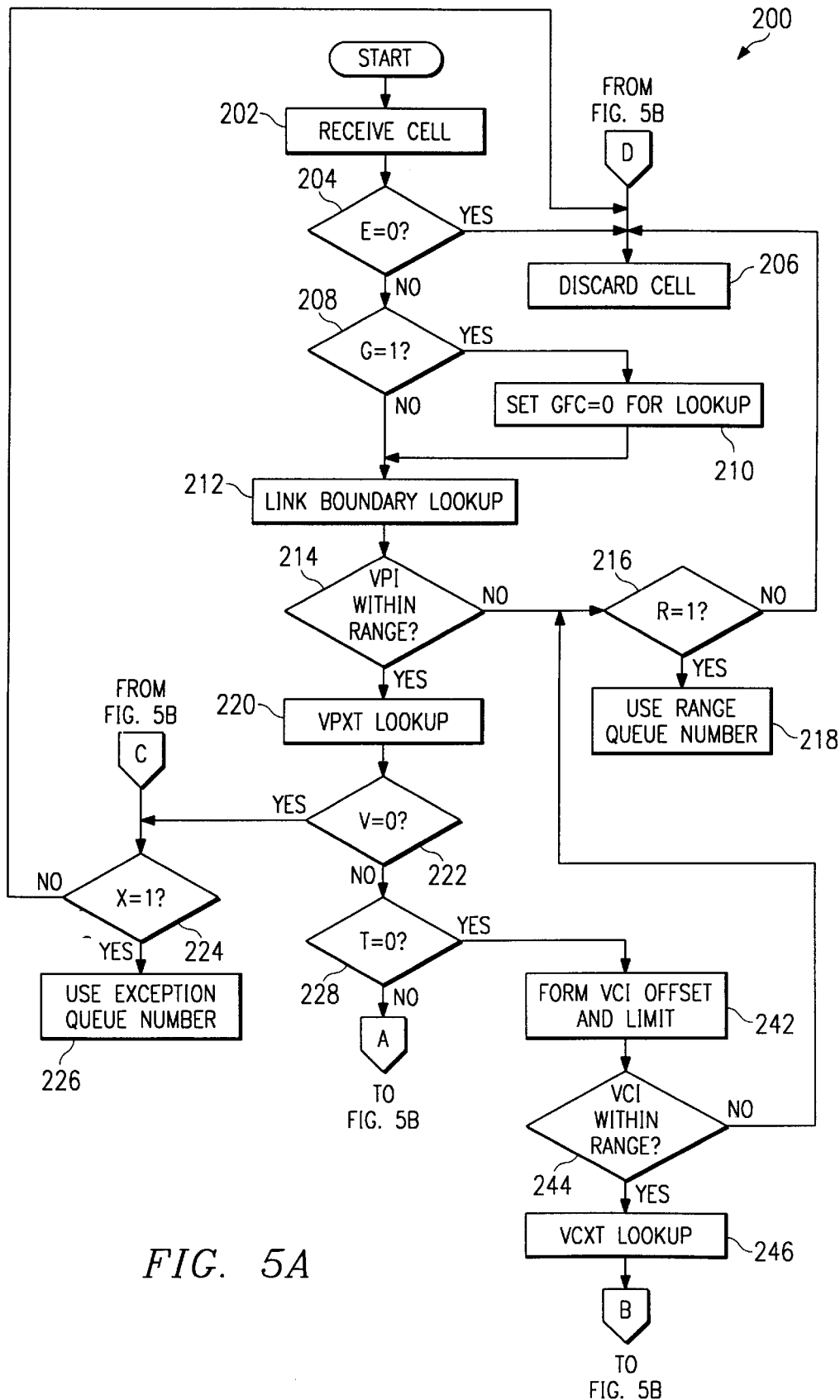
FIGS. 5A and B illustrate a flow chart of a method for mapping a data cell in a communication switch.
Figure 5B:
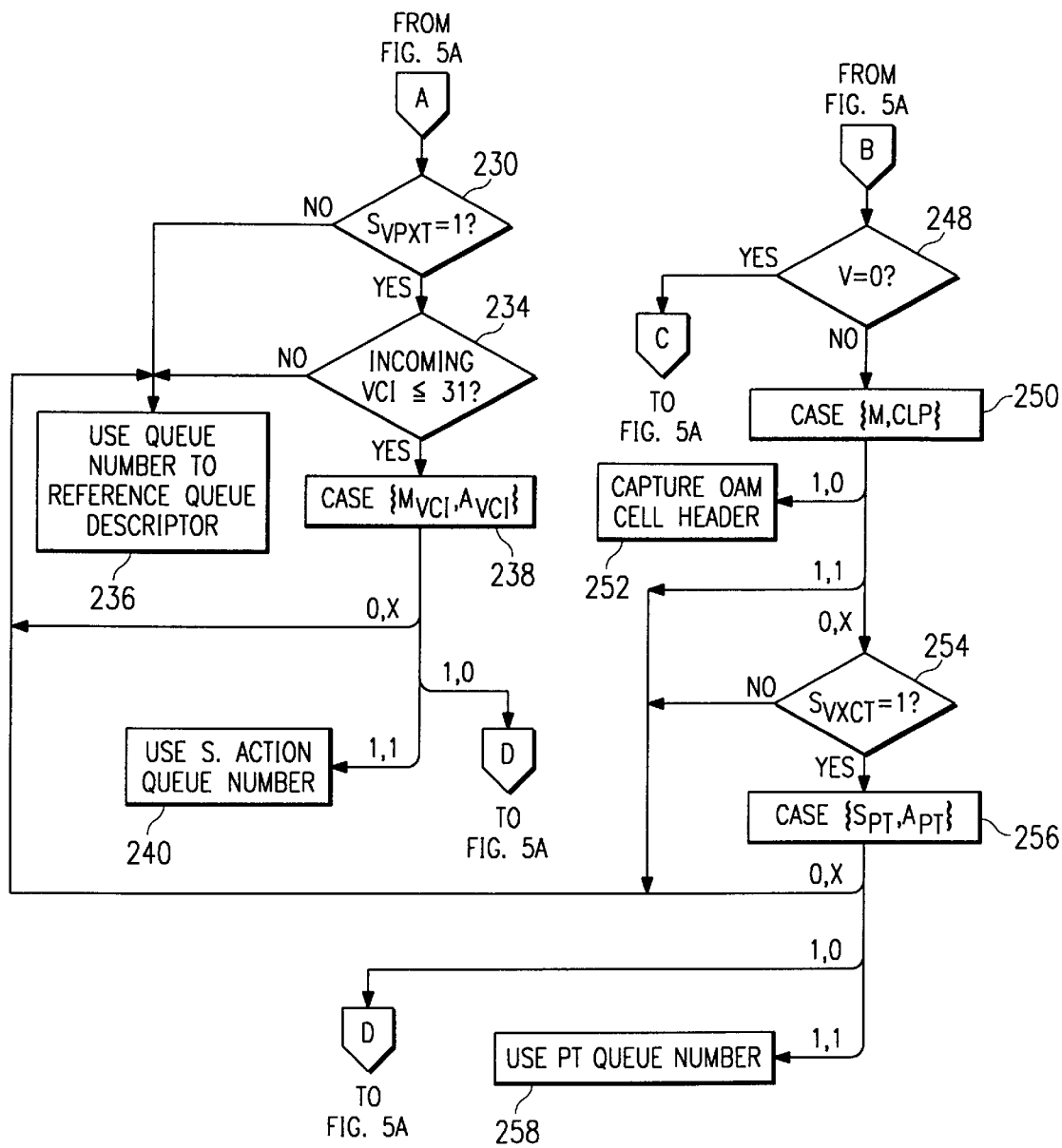

FIGS. 5A and B illustrate a flow chart of a method 200 for mapping a data cell in a communication switch. Method 200 describes the operation of system 10. Method 200 begins at step 202 where a data cell, such as incoming ATM cell 31, is received at one of links 16–30 of TSPP 12. At this incoming ATM cell 31 is converted into internal cell 32 that contains the ingress link number. TSPP 12 references a link boundary entry 64–78 in link boundary entry table 46, the link boundary entry corresponding to the link 16–30 at which the cell is received. For example, if internal data cell 32 is received at link 20 (labeled "LINK2"), boundary entry 68 is referenced.

At step 204, TSPP 12 determines whether the enable bit in the corresponding link boundary entry is set to "0." If so, TSPP 12 discards the data cell at step 206. Otherwise, if the enable bit is set to "1," TSPP 12 determines whether the GFC bit in the link boundary entry is set to "1" at step 208. If so, then TSPP 12 sets the GFC field equal to "0000" for the look-up process at step 210.

Using the information contained in the link boundary entry, TSPP 12 references the link table in VXT 40 corresponding to the link at which the data cell is received at step 212. Thus, for example, link "2" table 84 is referenced when internal cell 32 is received at LINK2. More specifically, link boundary entry 68 specifies a start 100 for link "2" table 84 in VXT 40. Link boundary entry 68 also specifies a VP limit 102 which separates VCXT section 86 from VPXT section 88 in the link table 84.

At step 214, TSPP 12 determines whether the VPI field 34 of the cell is within range. In other words, with regard to the example of internal cell 32, VPI field 34 of cell 32 must fall within VPXT section 88. If the VPI field is not within range, then at step 216, TSPP 12 determines whether range bit 48 in TSPP 12 is set to "1." If so, TSPP 12 uses range queue number 50 to reference a queue descriptor for further processing of the data cell at step 218. Otherwise, if range bit 48 is set to "0," TSPP 12 discards the data cell at step 206.

If the VPI field 34 of the cell is within range as determined at step 214, then TSPP 12 performs a VPXT look-up at step 220. In other words, TSPP 12 uses VPI field 34 in data cell 32 to reference either a VPXT queue entry or a VCXT range entry within VPXT section 88. At step 222, TSPP 12 determines whether the valid bit of the referenced entry is set to "0." If so, the entry is not valid. TSPP 12 then determines whether exception bit 52 in TSPP 12 is set to "1" at step 224. If so, TSPP 12 uses exception queue number 54 to referenced a special descriptor for further processing of the data cell at step 226. If exception bit 52 is set to "0," TSPP 12 discards the cell at step 206.

If TSPP 12 determines that the valid bit in the data entry is not set to "0" at step 222, then the entry is valid. TSPP 12 then determines whether the terminated virtual path bit of the entry is set to "0" at step 228. If the terminated virtual path bit is not set to "0," then the entry is a VPXT queue entry, such as VPXT queue entry 92. TSPP 12 then determines at step 230 whether the S bit 114 in the VPXT queue entry is set to "1." If the S bit 114 is set to "0," at step 236 TSPP 12 uses the TSPP VPS queue number from the VPXT queue entry to reference a queue descriptor from queue descriptor table 44 in memory 14.

If the S bit 114 of the VPXT queue entry is set to "1," TSPP 12 determines whether the value of the VCI field 36 in internal cell 32 is less than or equal to "31" at step 234. Typically, VCI values less than "31" are reserved for cells relating to special actions, such as establishing connections. If the value of VCI field 36 is greater than "31," TSPP 12 uses the TSPP VSP queue number from the VPXT queue entry to reference a queue descriptor at step 236.

If the value of VCI field 36 in data cell 32 is less than or equal to "31," then at step 238 TSPP 12 processes the data cell as a virtual path service connection according to special action table 60 of TSPP 12 as follows. If an M bit 60a of VCI field 36 is set to "0," TSPP 12 uses the TSPP VPS queue number from the VPXT queue entry at step 236. If the M bit 60a is set to "1" and the value of an A bit 60b of VCI field 36 is set to "0," TSPP 12 discards data cell 32 at step 206. Otherwise, if both the M bit 60a and the A bit 60b are set to "1," TSPP 12 uses special action queue number 62 in TSPP 12 to reference a queue descriptor contained within queue descriptor table 44 of memory 14.

Referring again to step 228, if the terminated virtual path bit in an entry is set to "0," the entry is a VCXT range entry, such as VCXT range entry 94 containing VCXT offset 104 and VC limit 106. At step 242, TSPP 12 forms a range for the VCI in link "2" table 84 using VCXT offset 104 and VC limit 106 at step 242. At step 244, TSPP 12 determines whether VCI field 36 of data cell 32 is within the established range. If not, TSPP 12 checks whether range bit 48 in TSPP 12 is set to "1" at step 216, as described above.

If VCI field 36 is within the established range, TSPP 12 performs a VCXT look-up in the retrieved link table at step 246. More specifically, TSPP 12 uses the VCI field 36 in the data cell 32 to reference a VCXT queue entry, such as VCXT queue entry 90, in VCXT section 86 of link table 84.

At step 248, TSPP 12 determines whether the valid bit of the referenced VCXT queue entry is set to "0." If so, the VCXT queue entry is not valid, and TSPP 12 determines whether exception bit 52 in TSPP 12 is set to "1" at step 224, as described above.

If the valid bit in the VCXT queue entry is set to "1," the queue entry is valid. TSPP 12 then processes the data cell 32 according to the OAM bit and a CLP bit of the cell at step 250 as follows. If the OAM bit is set to "1" and the CLP bit is set to "0," TSPP 12 captures the OAM cell header at step 252. If the OAM bit and the CLP bit are both set to "1," TSPP 12 captures the OAM payload, attaches the previously captured OAM header and then uses the TSPP VCS queue number in the entry to reference a queue descriptor from queue descriptor table 44 in memory 14 at step 236. If the OAM bit is set to "0," TSPP 12 determines whether the S bit 126 of the VCXT queue entry is set to "1" at step 254. If not, TSPP 12 uses TSPP VCS queue number of the VCXT queue entry to reference a queue descriptor from queue descriptor table 44 at step 236.

If the S bit 126 of the VCXT queue entry is set to "1," then at step 256 TSPP 12 processes the cell 32 as a VCI connection according to PT action table 56 in TSPP 12 as follows. If an S bit 56a in the VCXT queue entry is set to "0," TSPP 12 uses the TSPP VCS queue number in the entry to reference a queue descriptor from queue descriptor table 44 at step 236. If S bit 56a in the VCXT queue entry is set to "1" and A bit 56b is set to "0," then TSPP 12 discards data cell 32 at step 206. Otherwise, if S bit 56a and A bit 56b are both set to "1," TSPP 12 uses PT queue number 58 in TSPP 12 to reference a queue descriptor from queue descriptor table 42 of memory 14 at step 258.

It should be understood that if a cell received at TSPP 12 is a credit update cell, TSPP 12 processes the cell in substantially the same manner as method 200 described above, except that FSPP flow control queue numbers in the data entries of a referenced link table will be used instead of the TSPP queue numbers.

Multiple internal cells 32 may be received and mapped to various queue descriptors in queue descriptor table 44. Some of these internal cells may have different VPI/VCI identifiers, but nonetheless will be mapped to the same descriptors using VXT 40. Consequently, because a separate queue descriptor is not maintained for each VPI/VCI identifier, the amount of memory needed to support the internal cells is substantially reduced.

Although the present invention and its advantages have been described in detail, it should be understood that various changes, substitutions, and alterations can be made therein without departing from the spirit and scope of the invention as defined by the appended claims.

What is claimed is:

1. A system for mapping a data cell in a communication switch, comprising:

a virtual translation table comprising at least one virtual path translation table queue entry and at least one virtual channel translation table queue entry, and a plurality of link tables; and a to-switch port processor having at least one link operable to receive a data cell, the to-switch port processor operable to map the received data cell to a queue descriptor in response to a queue number in one of the virtual path translation table queue entry and the virtual channel translation table queue entry of the virtual translation table, the queue descriptor identifying how the data cell is to be processed, wherein each link table of the virtual translation table corresponds to a link of the to-switch port processor, each link table having at least one virtual path translation table queue entry and at least one virtual channel translation queue entry.

2. The system of claim 1, wherein:

each virtual path translation table queue entry comprises a virtual path selection queue number; and each virtual channel translation table queue entry comprises a virtual channel selection queue number.

3. The system of claim 1, wherein the to-switch port processor further comprises a link boundary look-up table comprising at least one link boundary entry, each link boundary entry corresponding to a link of the to-switch port processor, each link boundary entry identifying an access point into the virtual translation table.

4. The system of claim 3, wherein each link boundary entry comprises an offset defining a link table in the virtual translation table, the link table having at least one virtual path translation table queue entry and at least one virtual channel translation table queue entry, each link table corresponding to a link of the to-switch port processor.

5. The system of claim 1, wherein the to-switch port processor further comprises at least one action table, the action table identifying special processing to be performed with a data cell having a special condition indication.

6. The system of claim 1, wherein the virtual translation table is stored in a memory external to the to-switch port processor.

7. The system of claim 1, further comprising a queue descriptor table comprising a plurality of queue descriptors, at least one queue descriptor associated with a plurality of data cells having different virtual path and virtual channel identification fields, the queue descriptor table being accessed by a queue number from an appropriate one of the virtual path translation table queue entry and the virtual channel translation table queue entry.

8. The system of claim 1, further comprising a special descriptor table comprising a plurality of special descriptors identifying if any special processing is to be performed on the data cell.

9. A system for mapping multiple data cells to a single queue descriptor in a communication switch, comprising:

a queue descriptor table comprising at least one queue descriptor, the queue descriptor identifying how the data cell is to be processed;

a virtual translation table comprising a plurality of queue entries for referencing a single queue descriptor in the queue descriptor table; and a to-switch port processor operable to access the virtual translation table, the to-switch port processor further operable to receive a first data cell and a second data cell, each of the first and second data cells having an associated identifier, the identifier of the first data cell being different from the identifier of the second data cell, the to-switch port processor further operable to map each of the first and second data cells to queue entries in the virtual translation table, thereby mapping the first and second data cells to the single queue descriptor, wherein the virtual translation table includes a plurality of link tables, each link table corresponding to a link of the to-switch port processor, each link table having queue entries for referencing the single queue descriptor.

10. The system of claim 9, wherein the virtual translation table further comprises at least one virtual path translation table queue entry and at least one virtual channel translation table queue entry to allow for virtual path or virtual channel processing.

11. The system of claim 9, wherein at least one queue entry of the link table defines a range within the link table.

12. The system of claim 9, wherein the to-switch port processor further comprises a link boundary look-up table comprising at least one link boundary entry, each link boundary entry corresponding to a link of the to-switch port processor, the link boundary entry referencing a queue entry in the virtual translation table.

13. The system of claim 12, wherein each link boundary entry defines an offset within a link table, the link table having queue entries associated with the link boundary entry beginning at the offset.

14. The system of claim 9, further comprising a special descriptor table comprising at least one special descriptor identifying if any special processing is to be performed on the first and second data cells.

15. A method for mapping multiple data cells to a single queue descriptor in a communication switch, comprising the steps of:

receiving a first and a second data cell, each of the first and second data cells having an associated identifier, the identifier of the first data cell being different from the identifier of the second data cell;

referencing a virtual translation table comprising a plurality of queue entries, each queue entry specifying the same queue descriptor;

referencing a link boundary look-up table in response to the receipt of the first and second data cells, the link boundary look-up table comprising a plurality of link boundary entries, each link boundary entry corresponding to a link of a to-switch port processor, link boundary entries providing a reference to the virtual translation table; and mapping the first and second data cells to the queue descriptor using multiple queue entries from the virtual translation table.

16. The method of claim 15, wherein the step of referencing a virtual translation table comprises the step of referencing a link table using a link boundary entry associated with a link at which at least one of the first and second data cells was received.

17. The method of claim 15, further comprising the steps of:

determining a range for identifiers of at least one of the first and second data cells; and determining whether the identifier of the corresponding one of the first and second data cells is within the determined range for identifiers.

18. The method of claim 15, further comprising the step of validating a queue entry in the virtual translation table.

19. A method of mapping a data cell, comprising steps of:

receiving a data cell over a link;

determining whether a virtual path identifier field in the data cell is in a range corresponding to the link;

identifying a queue entry corresponding to the virtual path identifier field in response to the virtual path identifier field being within the range;

determining whether the queue entry indicates virtual path or virtual channel processing;

identifying a queue number in the queue entry in response to the queue entry indicating virtual path processing; and processing the data cell according to a queue descriptor associated with the queue number.

20. The method of claim 19, further comprising steps of:

determining whether special action is to be performed on the data cell; and identifying a special action queue number in response to an indication that special action is to be performed on the data cell.

21. The method of claim 20, further comprising steps of:

determining whether a virtual channel identifier field in the data cell has exceeded a threshold value in response to an indication that special action is to be performed on the data cell; and processing the data cell according to a queue descriptor associated with the special action queue number.

22. The method of claim 19, further comprising steps of:

determining whether the link has a cell discard indication; and discarding the data cell in response to the link having a cell discard indication.

23. The method of claim 19, further comprising steps of:

determining whether the queue entry is valid; and discarding the data cell in response to the queue entry being invalid.

24. The method of claim 23, further comprising steps of:

determining whether exception processing is to be performed on the data cell in response to the queue entry being invalid;

identifying an exception queue number in response to an indication that exception processing is to be performed on the data cell; and processing the data cell according to an exception queue descriptor associated with the exception queue number.

25. The method of claim 19, further comprising steps of:

determining whether out of range processing is to be performed on the data cell in response to the virtual path identifier field being out of range; and discarding the data cell in response to an indication that no out of range processing is to be performed on the data cell.

26. The method of claim 25, further comprising steps of:

identifying a range queue number in response to an indication that out of range processing is to be performed on the cell; and processing the data cell according to a range queue descriptor associated with the range queue number.

27. The method of claim 19, further comprising steps of:

identifying a virtual channel identifier limit and offset in response to the queue entry indicating virtual channel processing;

identifying a virtual channel queue entry in response to the limit and offset;

identifying a virtual channel queue number within the virtual channel queue entry; and processing the data cell according to a queue descriptor associated with the virtual channel queue number.

28. The method of claim 27, further comprising steps of:

determining whether the virtual channel queue entry is valid; and discarding the data cell in response to the virtual channel queue entry being invalid.

29. The method of claim 27, further comprising steps of:

determining whether exception processing is to be performed on the data cell in response to the queue entry being invalid;

identifying an exception queue number in response to an indication that exception processing is to be performed on the data cell; and processing the data cell according to an exception queue descriptor associated with the exception queue number.

30. The method of claim 27, further comprising steps of:

determining whether special action is to be performed on the data cell; and identifying a special action queue number in response to an indication that special action is to be performed on the data cell.

* * * * *